United States Patent [19]
Yoshigai

[11] Patent Number: 5,062,315
[45] Date of Patent: Nov. 5, 1991

[54] DEVICE FOR PREVENTING DISENGAGEMENT OF AN INNER WIRE OF A BOWDEN CABLE FROM A BICYCLE BRAKE OPERATING LEVER

[75] Inventor: Kenichi Yoshigai, Osaka, Japan
[73] Assignee: Yoshigai Kikai Kinzoku Co., Ltd., Osaka, Japan
[21] Appl. No.: 512,103
[22] Filed: Apr. 20, 1990
[51] Int. Cl.⁵ ............................................. F16L 1/10
[52] U.S. Cl. ................... 74/502.2; 74/502.6; 74/489; 403/315
[58] Field of Search ............... 74/502.2, 502.6, 501.6, 74/489; 403/315, 316

[56] References Cited

U.S. PATENT DOCUMENTS

| 2,449,167 | 9/1948 | Hopewell | 403/315 |
| 4,113,397 | 9/1978 | Snyder | 403/316 |
| 4,445,394 | 5/1984 | Yapp | 74/501.6 |
| 4,484,490 | 11/1984 | Shimano | 74/489 |
| 4,674,353 | 6/1987 | Yoshigai | 74/502.2 |
| 4,759,230 | 7/1988 | Nagano | 74/501.6 |

FOREIGN PATENT DOCUMENTS

| 1056432 | 4/1959 | Fed. Rep. of Germany | 74/489 |
| 839739 | 12/1937 | France | 74/502.6 |
| 2578935 | 9/1986 | France | 74/489 |
| 57-51192 | 11/1982 | Japan . | |
| 57-51193 | 11/1982 | Japan . | |

Primary Examiner—Gary L. Smith
Assistant Examiner—Flemming Saether
Attorney, Agent, or Firm—Sixbey, Friedman, Leedom & Ferguson

[57] ABSTRACT

In connecting an operating lever to the inner wire of a Bowden cable, a nipple is secured to one end of said inner wire, and on the other hand, a connector, in which a locking hole for engaging said nipple is formed, is supported within said operating lever so that the nipple of said inner wire engages the locking hole of said connector. Also, a ring body which presses the top surface of the nipple is attached to the circumferential surface of said connector to restrain said nipple within the locking hole of said connector. Said ring body prevents the nipple from unexpectedly projecting or falling from the connector as a result of elongation, etc. of the inner wire. The ring body has a handle-shaped pickup portion with a slot-shaped tool opening and is carried solely by the connector hidden within the operating lever.

3 Claims, 2 Drawing Sheets

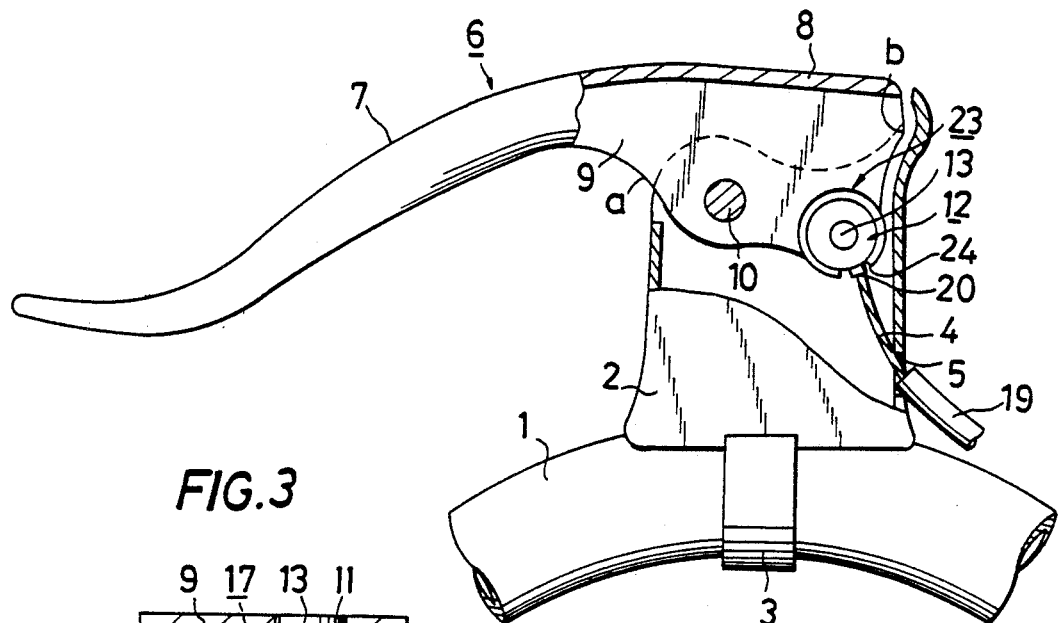
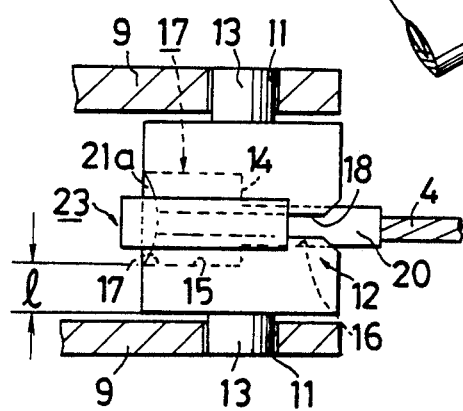
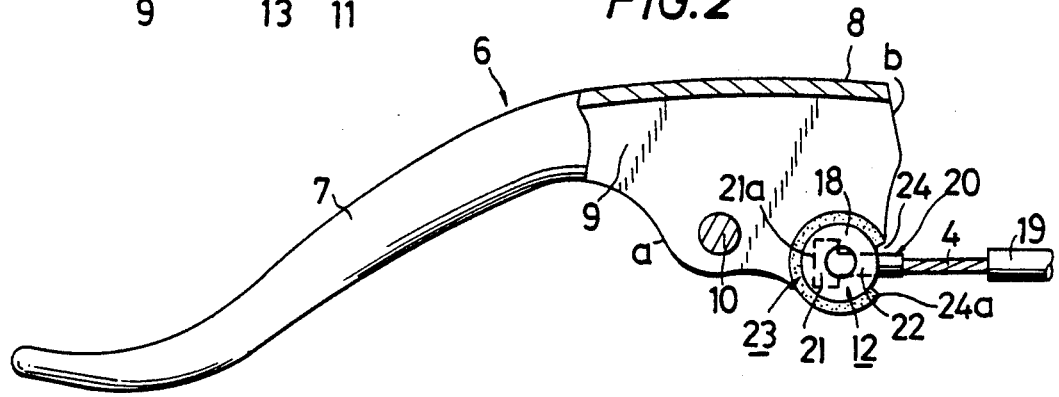

DEVICE FOR PREVENTING DISENGAGEMENT OF AN INNER WIRE OF A BOWDEN CABLE FROM A BICYCLE BRAKE OPERATING LEVER

FIELD OF THE INVENTION AND RELATED ART STATEMENT

This invention relates to an improved device for preventing disengagement of the connection at the end of an inner wire a Bowden Cable in a bicycle brake operating lever.

The bicycle brake operating mechanism consists of a brake operating lever provided on the handle and a brake device mounted to the frame, which are connected by means of a Bowden cable consisting of inner and outer wires. As regards the construction of the connection between said operating lever and the inner wire of the Bowden cable, a nipple is secured to the end of said wire, and on the other hand, a connector, in which a locking hole with a slit for engaging said nipple is formed, is pivotally supported to the operating lever. The nipple at the end of said wire is locked to the connector, whereby the inner wire is pulled by pivoting of the operating lever.

If, however, the inner wire is excessively slack, or pivot return operation of the operating lever or the force of the spring provided on the brake device side reduces during the above operation, one of these factors can cause the nipple of said inner wire to jump out of the locking hole of the connector, resulting in the wire falling from the slit unexpectedly. This is especially noticeable when the operating lever is provided with a spring for pivot return.

As a result, a stable and smooth braking cannot be obtained always, or braking is likely to be impossible. It is also inconvenient in repair and adjustment.

To solve the above defect, a nipple regulating lever, which can be operated from outside so that it advances or retreats, is inserted into the operating lever, and this regulating lever is allowed to project into the top surface of the nipple so that the nipple engaged in the connector is restrained within the locking hole as shown, for example, in Examined Japanese Utility Model Publication SHO 57-51192. Also shown in Examined Japanese Utility Model Publication SHO 57-51193 a nipple regulating jig equipped with a handle piece locked to a part of the external wall surface of the operating lever, and with a holding piece, which is projected in one surface of said handle piece and can be held by the connector, is formed beforehand. Said holding piece is inserted into the operating lever so that it may advance or retreat, and said holding piece is attached to said connection so that the nipple engaged in the connector is restrained within the locking hole.

Even if, however, the nipple of the inner wire can be prevented from unexpectedly departing or falling from within the locking hole of the connector in the above conventional example, a special fitting such as the nipple regulating lever or nipple regulating jig should be inserted into the operating lever from outside for fitting. This increases number of parts, and also it takes time to fit resulting in higher cost. Moreover, a fitting required for inserting or fitting said nipple regulating lever to the outer surface of the upper wall of the operating lever is seen, and the appearance is not good either.

OBJECT AND SUMMARY OF THE INVENTION

It is an object of the present invention to effectively prevent the nipple of the inner wire with a simple configuration from loosening within the locking hole of the connector or unexpectedly falling out as a result of elongation of the inner wire or reduced elastic force of the spring on the brake device side.

It is another object of the present invention to reduce the number of parts, facilitate combined assembly and disassembly for the operating lever and inner wire, and reduce the cost.

A device for preventing disengagement of a Bowden cable; inner wire in a bicycle brake operating lever of the invention consists of a brake operating lever 6 provided on the handle and a brake device mounted to the frame (not shown), which are connected by means of a Bowden cable 19 consisting of inner wire 4 and an outer wire. As regards the construction of the connection between said operating lever 6 and the inner wire 4 of the Bowden cable 19, a nipple 20 is secured to the end of said wire 4, and on the other hand, a connector 12, in which a locking hole 17 with a slit 18 for engaging said nipple 20 is formed, is pivotally supported to the operating lever 6. The nipple 20 at the end of the wire 4 is locked to the connector 12. The nipple 20 is locked to the connector 12 so that the nipple 20 is restrained within the locking hole 17 of the connector 12, and a ring body 23 is attached around the circumferential surface of said connector 12 so that the top surface 21a of the nipple 20 is pressed.

As a method to fit and adjust the ring body 23, the ring body 23 formed to a specified shape beforehand is attached around the circumferential surface of the connector 12, and then it is brought up to one end in the shaft center axis direction of this connector 12. Then the nipple 20 is inserted into the locking hole 17 of the connector 12 for engaging. Finally the tip of a tool such as a screw-driver is inserted through an opening a or b in the lower wall or rear wall of the operating lever 6 to move said ring body 23 to the center position in the shaft center axis direction of the connector 12.

As another method to fit and adjust the ring body 23, the nipple 20 is first inserted into the locking hole 17 for the nipple 20 within the connector 12 for engaging to pick up and insert the ring body 23 through the opening a or b of the operating lever 6 and to attach it at the center, in the shaft axis center direction, of said connector 12.

In the above state, the top surface 21a of the nipple 20 engaged within the locking hole 17 of the connector 12 is stopped up with the ring body 23 to prevent the nipple 20 from unexpectedly projecting or falling from the connector 12 as a result of elongation, etc. of the inner wire 4.

The present invention, with a simple configuration, can effectively prevent the nipple 20 of the inner wire 4 from loosening within the locking hole 17 of the connector 12, projecting forward or unexpectedly falling from the slit 18 as a result of elongation of the inner wire 4 or reduced elastic force of the spring on the brake device side.

Accordingly, it enables the number of parts to be reduced, facilitating combined assembly and disassembly for the operating lever 6 and inner wire 4, and reducing the cost. In addition, a hole to mount the nipple regulating jig, etc. to the operating lever 6, as seen in a conventional example is not required, and the ring body 23 attached to the connector 12 is not seen from outside thereby, having a good appearance.

BRIEF DESCRIPTION OF THE DRAWINGS

FIG. 1 to FIG. 5 show the first embodiment of the present invention, with FIG. 1 being a partially cutaway entire side view showing a brake operating lever arrangement having a device for preventing disengagement of the inner wire of a Bowden cable according to the invention mounted to a handle.

FIG. 2 is a partially cutaway side view of the operating lever portion.

FIG. 3 is an enlarged partial sectional top view of part of the FIG. 2 arrangement.

FIG. 4 is a perspective view showing the connector with a ring body attached of FIGS. 1–3.

FIG. 5 is an end view of the connector and ring body of FIG. 4.

FIG. 7 is an end view of the connector and ring body of FIG. 6.

FIG. 9 is an end view of the connector and ring body of FIG. 8, and

FIG. 10 is a right side view of FIG. 9.

DESCRIPTION OF THE PREFERRED EMBODIMENT

Figure 4:
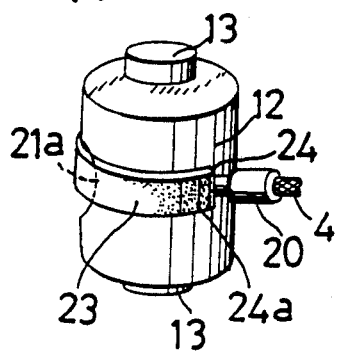

Referring to the illustrated embodiments, the present invention is described below.

FIG. 1 to FIG. 5 show the first embodiment of the present invention. In the FIGS., 1 is the handlebar of a bicycle, and 2 is a mounting bracket vertically secured to the handlebar 1 by means of a connecting band 3, being generally of a box type apertured above. In the lower part of the front wall of mounting bracket, there is a guide hole 5 provided to pass the inner wire 4 through.

Operating on lever 4 has a rear half which is a holding lever 7, and a front half which is equipped with a top wall 8 and (right and left) side walls 9, which are incorporated into one-piece body having a inverted U-shaped cross-section. Accordingly; the lower portion and front portion of the front half have openings a and b. This operating lever 6 is supported by a fulcrum shaft 10 around and its side walls 9, are inserted between the right and left side walls of said mounting bracket 2.

A pair of (right and left) supporting holes 11 are provided in front of said fulcrum shaft 10 on both side walls 9 of said operating lever 6. Minor axles 13 provided at the shaft center axis at both ends of the cylindrical connector 12 are inserted into said supporting holes 11, 11 to pivotally support the connector 12. The locking hole 17, consisting of a circular holeshaped large diameter portion 15 and a circular hole-shaped small diameter portion 16, is provided so that it penetrates through a step 14 radially at the center in the shaft center axis direction of said connector 12. Also, a slit 18 which communicates with said locking hole 17 is provided along the shaft transverse center plane. In this case, the width of said slit 18 is smaller than the diameter of the small diameter portion 16 and slightly larger than the diameter of the inner wire 4 in the embodiment illustrated. A nipple 20, provided at one end of inner wire 4 of the Bowden cable 19, is removably engaged within the locking hole 17; so that the inner wire 4 is pulled by pivoting operation of the operating lever 6. Said nipple 20 has an external shape of the same shape as the internal shape of the locking hole 17, consisting of a head 21 of the large diameter and a shell 22 of the small diameter.

23 is a belt-shaped ring body which is attached like a spring clip to the circumferential surface of the connector 12 at nearly its axial center so that the top surface 21a of the nipple 20 engaged within the locking hole 17 of said connector 12 is stopped up. Said ring body 23 nearly the same internal diameter as the diameter of said connector 12, and has nearly the same width as a width l between the bottom face of connector 12 and locking hole 17. The ring body is also a C-shaped ring provided with a notch 24 that is wider than the diameter of a shell 22 of the nipple 20 at least at one end. The entire ring body is composed of, for example, a belt-shaped body with a rectangular cross section made of elastic hard synthetic resin or metal so that both ends 24a, 24a of said notch 24 may expand or contract when the ring body is fitted into the circumferential surface of connector 12. The Both ends 24a, 24a of said notch 24 are desirably radius-shaped to facilitate fitting of the ring body onto the circumferential surface of the connector 12. Irregular grooves may be formed on the internal circumferential surface of the ring body 23 to ensure that the ring body does not easily come off after fitting into the connector 12.

Figure 6:
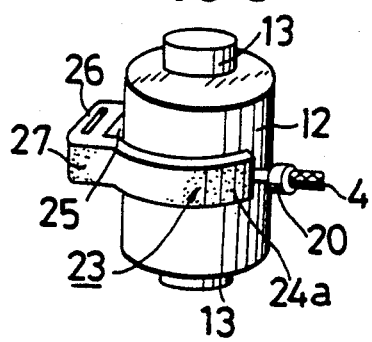
FIGS. 6 and 7 show the second embodiment of the present invention, with FIG. 6 being a perspective view showing a connector with a ring body attached.
Figure 7:
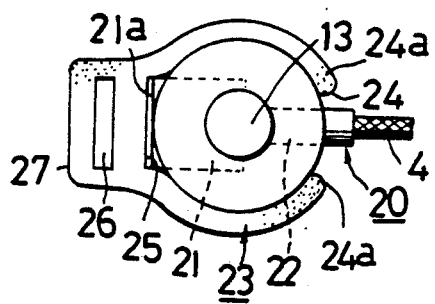

FIGS. 6 and 7 show the second embodiment of the present invention, and the ring body 23 is C-type ring-shaped having a notch 24. A fitting concave portion 25 that is slightly wider than a diameter of the top surface 21a of the nipple 20 is provided in the internal circumferential surface of the ring body 23 facing said notch 24, and also a handle-shaped pick-up portion 27 having a through hole 26 at its center is integrally formed in the external circumferential surface of the ring on the opposite side of the ring body from said notch 24. Other configurations are the same as those of said first embodiment.

In the ring body 23 of said first and second embodiments, its notch 24 is fitted against the circumferential surface of the connector 12 in a direction facing toward the shaft center until it snaps onto the connector 12. If mounted before the inner wire is connected, the ring body attached to said connector 12 is brought up to one end of the connector along the shaft center axis direction of said connector 12. After engaging the nipple 20 of the inner wire 4 within the locking hole 17 of the connector 12, the top surface 21a of said nipple 20 may be stopped up by moving the ring body to the center of the connector 12 along the shaft center axis.

Alternatively, after first engaging the nipple 20 of the inner wire 4 within the locking hole 17 of the connector 12, the top surface 21a of said nipple 20 may be stopped up by fitting the ring body 23 in said first and second embodiments onto the circumferential surface at the center along the shaft center axis of said connector 12 with its notch 24 facing toward the inner wire 4 side.

Also, the ring body 23 in said first and second embodiments may be more strongly attached to the circumferential surface or the connector 12 by using a ring body having a width greater than a width l between the bottom face of connector 12 and the locking hole 17 to make the surface area of the ring body attached to the circumferential surface of the connector 12 larger. In this case, however, the nipple 20 should be engaged with the connector 12 before fitting the ring body onto the circumferential surface of the connector 12.

Figure 8:
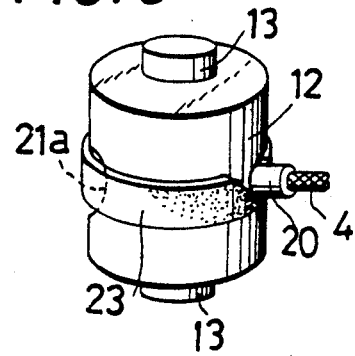
FIG. 8 to FIG. 10 show the third embodiment of the present invention, with FIG. 8 being a perspective view showing a connector with a ring body attached.
Figure 5:
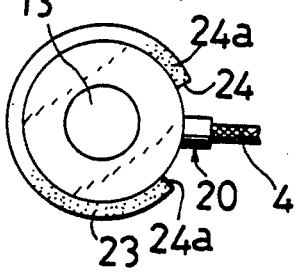
Figure 9:
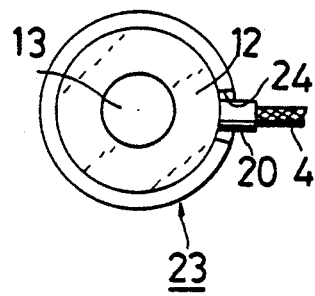
Figure 10:
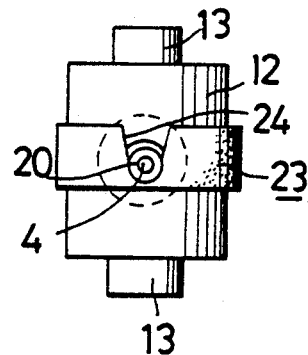

FIGS. 8 to FIG. 10 show the third embodiment of the present invention, and the notch 24 of the ring body 23 is U-shaped, and the lower edge of the ring is continuous and makes a circular ring. Other configurations are the same as those of said first embodiment.

The configuration of the brake lever and bracket is not limited to the illustrated embodiments, but any configurations including those shown in each publication of prior art may be used. The connector with only the locking hole 17 and without the slit 18 may be used.

What is claimed is:

1. A device for preventing disengagement of an inner wire of a Bowden cable from a bicycle brake operating lever, wherein the Bowden cable has a nipple secured to one end of said inner wire, wherein a connector, in which a locking hole for engaging said nipple is formed, is supported within said operating lever, wherein a ring body is attached upon a circumferential surface of said connector in the area of the locking hole to retain said nipple within the locking hole of said connector, and wherein said ring body is carried solely by said connector hidden within said operating lever, has a fitting concave portion over a head of the nipple, san has a handle-shaped pickup portion with a slot-shaped through hole for a tool.

2. A device according to claim 1, wherein the ring body is a C-shape ring with an opening notch, said C-shape having a rectangular cross section made of elastic, hard synthetic resin or metal.

3. Device according to claim 2, wherein the fitting concave portion is slightly wider than the diameter of the top surface of the nipple and is formed in an internal circumferential surface of the ring body body at a location facing the notch.

* * * * *